Sept. 25, 1962 D. B. JAMES ETAL 3,056,085

COMMUNICATION SYSTEM EMPLOYING PULSE CODE MODULATION

Filed Nov. 30, 1959 2 Sheets-Sheet 1

INVENTORS D. B. JAMES
R. M. WOLFE
BY
R. C. Winter
ATTORNEY

Sept. 25, 1962 D. B. JAMES ETAL 3,056,085

COMMUNICATION SYSTEM EMPLOYING PULSE CODE MODULATION

Filed Nov. 30, 1959 2 Sheets-Sheet 2

INVENTORS O. B. JAMES
R. M. WOLFE

BY R. C. Winter

ATTORNEY

United States Patent Office 3,056,085
Patented Sept. 25, 1962

3,056,085

COMMUNICATION SYSTEM EMPLOYING PULSE CODE MODULATION

Dennis B. James, Far Hills, and Robert M. Wolfe, Colonia, N.J., assignors to Bell Telephone Laboratories, Incorporated, New York, N.Y., a corporation of New York Filed Nov. 30, 1959, Ser. No. 856,119
29 Claims. (Cl. 325—38)

This invention relates to signal translating apparatus and, more particularly, to such apparatus utilizing pulse code modulation techniques.

Coders as known in the art comprise elements arranged so as to translate a complex input signal wave into successive trains of fixed amplitude pulse signals arranged in a particular code pattern. In general, this result is obtained by analyzing successive samples of the input signal and generating a distinct binary code group to correspond to the amplitude of each sample. In order to analyze the complex input signal, a selected amplitude sample is stored and compared with a succession of different reference signal amplitudes. When the stored amplitude sample is suitably matched by a particular combination of reference signal amplitudes, the encoding apparatus recapitulates the number of distinct reference signals utilized in forming the suitable matching amplitude level in an appropriate output code indication.

It is common practice to obtain the distinct reference signals used in the comparison process with the aid of active elements such as flip-flops or wave generating apparatus. These active elements initiate signals of distinct amplitudes in consecutive time intervals which are compared cumulatively with the input signals to obtain each output code indication. Thus the amplitude of each reference signal must persist until the entire output code group is obtained. By adding together these reference signals, a succession of reference amplitudes that increase in a step-wise fashion with time is obtained. When the reference amplitude level is reached which most closely matches the input signal sample amplitude, the addition of reference signals is stopped, and the code train representing the input signal sample is completed.

It is recognized in the art that there is a tendency for active elements to produce reference pulses which drift in amplitude with time. Thus, when individual reference pulses extend over several time intervals, the possibility of coding error arises. For instance, if there is an appreciable trail-off in the amplitude of the first reference pulse, this deteriorating pulse, when added to the succeeding reference pulses utilized to form one code group, would require the accumulation of a greater number of pulses than normally required to obtain the appropriate matching amplitude. The output code train which is determined by the number of reference signal pulses utilized in forming the matching amplitude would thus provide an erroneous indication of the input signal sample.

In an effort to eliminate the active comparison elements and their associated disadvantages, other types of encoders such as the one shown in J. R. Pierce Patent 2,508,622 have been developed. Generally, such encoders use passive elements in the form of a plurality of resistances to obtain the requisite reference signals. These resistances are added to or omitted from the circuit in order to obtain a desired balance between the cumulative reference signal amplitude and the signal sample amplitude. The numerous components necessary to provide the reference signals, the complexity of the circuitry necessary to add and subtract the passive elements, and the burdensome power supply requirements tend to make such a solution to the problem unattractive.

A further disadvantage of the above-mentioned passive element encoder may be found by reference to time division communication systems, such as the PCM time division telephone system disclosed in Patent 2,957,949 by James-Johannesen-Karnaugh-Malthaner, issued October 25, 1960. In such a system it has been found that, in order to maintain proper fidelity, the information which is to be represented by coded indications must be sampled at approximately 8,000 times each second. Considering that such a system may serve a large number of multiplex information sources simultaneously, the time available to complete each indication in the code train, representing a sample from each one of the plurality of information sources involved, may be less than a microsecond. In view of such exceedingly short time intervals available to complete the coding operation, trial and error comparison processes involving the omission or addition of elements become even less attractive.

Accordingly, it is a general object of our invention to provide an improved signal translating system for translating between PCM and analog signals. More specifically, it is an object of this invention to provide an improved signal translating system capable of operation at the high speeds necessary in systems such as those involving time division multiplex.

It is a further object of this invention to provide requisite coding accuracy with a simple, rugged, and economical signal translating apparatus.

These and other objects of our invention are attained in one specific illustrative embodiment wherein a signal translating system comprises a capacitor for storing a charge which is proportional to the amplitude of a discrete time segment sample of an input signal and a plurality of additional capacitors which store reference signals for comparison with the input signal sample.

A circuit utilizing capacitors of different sizes for storing binary weighted charges offers a straightforward approach to the provision of the essential reference signal amplitudes or levels. The use of standard capacitors, however, is not entirely satisfactory in that different size capacitors necessary to establish binary weighted charges are difficult to standardize, the time constants for the larger capacitors prove troublesome, and valuable time is wasted in a clamping action that is mandatory for each reference capacitor used. Added to the above-mentioned difficulties is the disadvantage of having to provide an extremely accurate and stable potential source necessary to charge the various reference capacitors.

We have found, however, that ferroelectric capacitors satisfy the requirements of translators in accordance with our invention in that they are capable of delivering predetermined or metered charge rapidly and accurately to a load. Thus, in accordance with one aspect of our invention, a signal translating system includes a plurality of ferroelectric capacitors which are utilized to form the various reference signal levels necessary for comparison with the level of each input signal sample.

The ferroelectric capacitors advantageously are divided into two groups such that distinct binary weighted charges of both positive and negative polarity are available to to be used as reference signals. Each of the groups in turn is connected by distinct gates to the sampling capacitor which holds the input signal sample charge.

When the encoding operation commences, one of the gates connected between the sampling capacitor and the reference signal groups will be operated to allow reference signals opposite in polarity to the stored signal sample to be compared with the signal sample. Thus, the charge stored in the sampling capacitor, representing the initial sample, is reduced in discrete steps by the amount of charge available in each particular reference signal utilized.

The reference capacitor sequence used in altering the signal sample commences, in this illustrative embodiment, with the largest reference signal charge and ends when the smallest reference signal charge has been dissipated. This sequential use of the highest to lowest valued reference capacitors of one common polarity would occur, however, only if the signal sample charge was the maximum amplitude that the coder could handle. In many cases, the sample to be coded is less than the maximum that the coder can handle. In such instances, at some point in the encoding process a charge used as one of the reference signals will be greater in absolute magnitude than the sample signal charge remaining in the sampling capacitor.

When this situation arises, the circuit, in accordance with this embodiment of the invention, is arranged such that a reference signal charge of opposite polarity to that of the preceding reference signal charge is utilized in the following comparison step. This switching back and forth between the two distinct groups of ferroelectric elements at the appropriate time provides an expedient method of canceling out and rectifying what may be termed an invalid comparison step. The circuitry which accomplishes this appropriate switching operation also functions to send out one binary code indication for valid comparison steps and the other binary code indication for the invalid comparison steps. The series of indications representing the valid and invalid comparison steps when viewed as an entire code train thus provides an indication of the amplitude of the input signal sample.

In accordance with one aspect of this invention, the reference ferroelectric capacitors advantageously may be formed by plating a series of distinct electrodes on one side of a single strip of ferroelectric material with a common electrode plated on the other side. A high degree of accuracy in the forming of each capacitor is obtained by utilizing an accurate template to regulate the size of the plated-out electrode areas. The use of this single template would furthermore establish uniformity and standardization throughout the various reference capacitor elements.

Accordingly, it is a feature of our invention that a signal sample be diminished in absolute amplitude by reference signals of decreasing amplitude, the reference signals being always of opposite polarity to that of the remaining portion of the signal sample.

It is another feature of our invention that the reference signals applied be of decreasing amplitude in binary weighted steps.

It is a further feature of our invention that an output pulse only be generated after a diminution of the signal sample if the remainder of the signal sample be of one polarity. Further, it is a feature of our invention that a sign bit output pulse may also be generated prior to diminution of the signal sample if the signal sample is of the above-mentioned one polarity.

It is a still further feature of our invention that the reference signals be obtained from two storage groups, one for each polarity, and that gating circuitry be provided to connect the signal sample storage element to that group of reference signals of opposite polarity to the polarity of the remaining portion of the signal sample.

It is another feature of this invention that the value of an input signal sample be established by comparing it with a number of discrete valued reference signals obtained from ferroelectric capacitive elements.

It is another feature of this invention that the ferroelectric capacitive elements providing the reference signals comprise distinct positively and negatively charged groups of capacitors.

It is still another feature of this invention that the ferroelectric capacitors in the oppositely charged groups be switched successively in pairs and that the resultant charges be compared with the input signal sample by applying the charges selectively to a sampling capacitor initially storing the input signal sample.

It is yet another feature of this invention that the initial coder output indicates the polarity of the input signal sample and that succeeding coder outputs indicate the polarity of the signal stored in the sampling capacitor after each comparison with the selectively applied reference signals.

A complete understanding of these and other features of this invention may be gained from consideration of the following detailed description, together with the accompanying drawing, in which.

Figure 1:
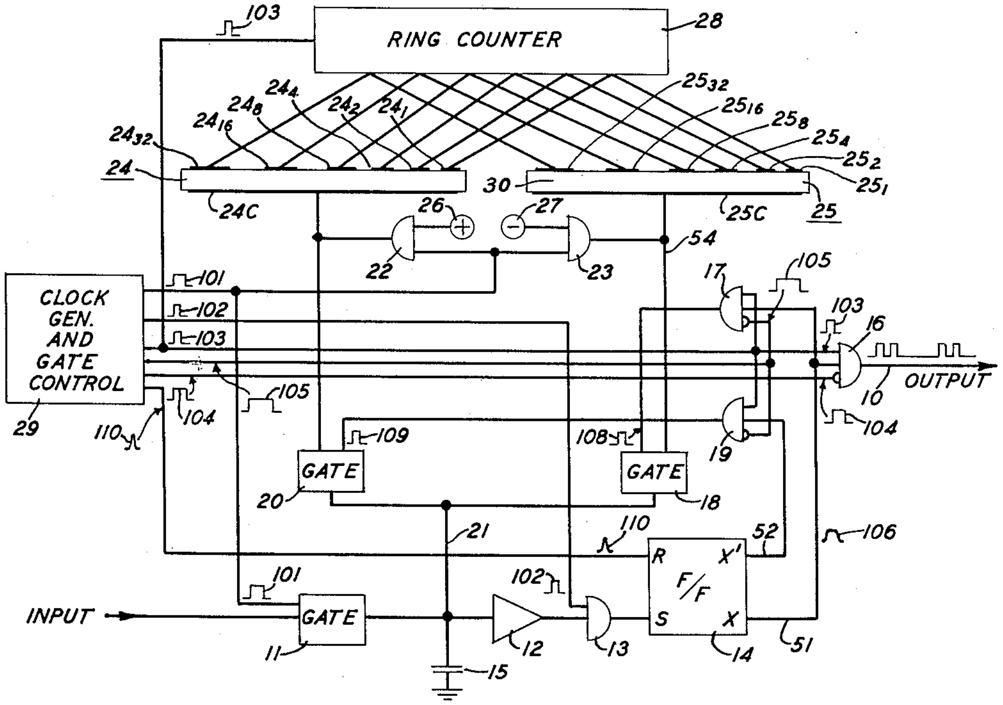
FIG. 1 is a schematic arrangement partially in block diagram form of a multiple digit encoder in accordance with one specific embodiment of the invention.

Turning now to FIG. 1, a schematic circuit partially in block diagram form of the signal translating apparatus in accordance with our invention is shown. The circuit comprises a capacitor 15 which stores a sample of the input signal received through sampling gate 11, indicative of a distinct amplitude of the input signal wave. A series circuit comprising an amplifier 12, a coincidence or AND gate 13, and a bistable flip-flop 14 is connected to sampling capacitor 15 to check the stored sample.

The bistable flip-flop 14 is utilized to accomplish three operations. The first operation is to send coded indications from one of the output terminals of flip-flop 14 through inhibit gate 16 to a common communication link 10. Also, if the sample stored in capacitor 15 is of the proper polarity, the same output terminal of flip-flop 14 will perform the second operation which is to send an enabling pulse to a second inhibit gate 17. This enabling pulse will allow inhibit gate 17 to operate gate 18 to which it is connected. The third operation will occur if the sample stored in capacitor 15 is of opposite polarity than the sample that initiated the second operation. If such is the case, the second output lead of bistable flip-flop 14 would send an enabling pulse through a connection to inhibit gate 19 so as to operate gate 20.

Both gates 18 and 20, as well as transmission gate 11, may advantageously be of the type shown in Johannesen-Meyers-Schwenker Patent 2,899,570, August 11, 1959. Generally, such gates comprise transistors normally reverse biased with respect to the transmission path so that the gates are permitted to conduct a signal only upon application of an enabling pulse thereto. The application of the enabling pulse to the normally reverse biased transistors changes the control gates from a state of high impedance to a state of low impedance, thus permitting essentially lossless passage of a signal.

The inhibit gates utilized are logic gates, familiar to the art, which will not deliver an output indication if a pulse is applied to the inhibit input lead even though all other input conditions are satisfied. The coincidence or AND gates utilized, also familiar to the art, yield an output when all of the input connections are energized. These gates may be generally of the type described in an article in the November, 1952 issue of the Proceedings of the IRE by J. H. Felker, pages 1584–1596.

When control gates 18 and 20 are in the operative or low impedance condition, direct paths to ground from ferroelectric elements 24 and 25 through common lead 21 and storage capacitor 15 are provided. These paths are utilized to conduct the reference signal levels produced by the ferroelectric elements to capacitor 15. Six separate reference signal levels advantageously are provided by each of the ferroelectric elements 24 and 25, with each element comprising six binary weighted capacitors. Binary weighted, as utilized herein, indicates that the charge delivered by each of the plurality of capacitors represents a distinct value corresponding to the significance of each digit position in the conventional binary code, i.e., 32, 16, 8, 4, 2, 1. This binary weighting is attained in this specific embodiment by providing upper electrodes $24_{32}$, $24_{16}$, etc. and $25_{32}$, $25_{16}$, etc. of different areas and common lower electrodes $24_c$ and $25_c$ on the common ferroelectric dielectric.

The dielectric of the ferroelectric capacitors shown may be any of the types known in the art that exhibit a relatively "square" hysteresis loop similar to the "loops" exhibited by ferromagnetic materials. This "electrostatic hysteresis," as it is conveniently termed, provides two stable remanent polarization states, as more thoroughly explained in J. R. Anderson Patent 2,717,372, September 6, 1955. Briefly, however, one remanent polarization state is obtained in a ferroelectric material when an electric field of one polarity is applied through the thickness of the crystal and then removed. The other polarization state is obtained by the application and removal of an electric field of opposite polarity.

The fields necessary for the establishment of the two opposite polarization states are advantageously obtained by the application of signals from the positive and negative voltage sources 26 and 27. These sources are connected to ferroelectric elements 24 and 25 by the enablement of AND gates 22 and 23 while gates 18 and 20 are disabled, thus isolating storage capacitor 15 from the ferroelectric elements. After the connection and subsequent disconnection of the potential sources, the ferroelectric elements will be in preselected polarization states. These respective states will persist until the corresponding ferroelectric elements are switched to the opposite polarization states. In order to accomplish this switching operation, a pulse of proper strength and polarity is applied to each ferroelectric element from a suitable source, such as, for example, the ring counter 28.

The ring counter 28 and the clock generator and gate control circuit 29 advantageously comprise well-known pulse forming and timing components which serve to provide various pulses in a preassigned time sequence to the individual components in the circuit of FIG. 1. The ring counter 28 is connected to the ferroelectric elements 24 and 25 such that by cycling continuously, it provides the pulses necessary to switch simultaneously each pair of oppositely charged capacitors having the same binary weight. In this specific illustration, the switching order cycles from the largest down to the smallest binary weighted capacitors, though it is obvious that the switching order might also be revised to suit any desired operation by proper modification of the overall circuitry.

The capacitive charge actually used as a reference signal level depends upon which of the control gates is in its operative or low impedance condition at the time of the switching. The control gate operation, as explained earlier, depends, in turn, upon the polarity of the signal sample stored in sampling capacitor 15. In any event, after the ring counter 28 has completed one cycle and all of the binary weighted ferroelectric capacitors have been pulsed, six reference level signals will have been used, the original signal sample will be dissipated, and a representative binary output train will have been transmitted to communication link 10 by the encoder.

Figure 2:
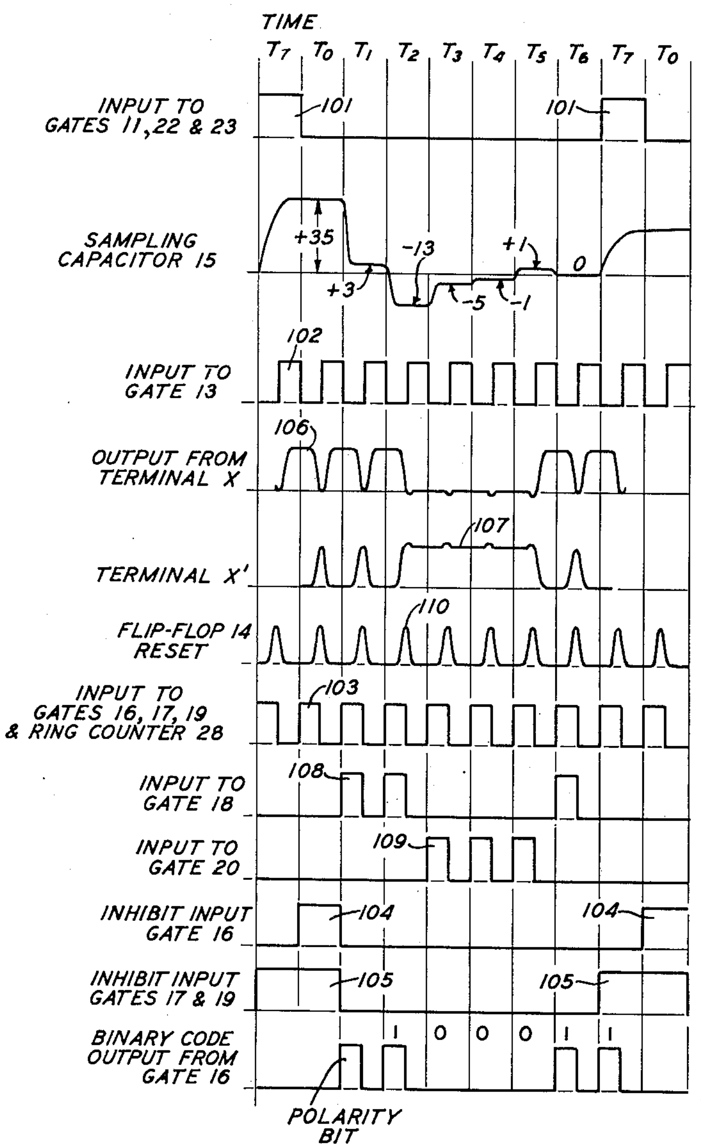
FIG. 2 is a series of pulse trains and wave forms illustrating the operation of the encoder in FIG. 1.

The encoding operation can best be illustrated by considering the processing of a typical input signal sample. The operation is initiated upon delivery of an enabling pulse 101, FIG. 2, from clock generator and gate control 29 to the input gate 11, thereby permitting an instantaneous sample of the input signal to be stored in the sampling capacitor 15. A typical signal sample which stores +35 units of charge in the sampling capacitor 15 is illustrated in FIG. 2. The pulse 101 also serves to enable AND gates 22 and 23 in order to preset reference signal capacitors 24 and 25 so as to place them in their preselected polarization states through the charging paths from battery sources 26 and 27 to ground in ring counter

28, which paths include enabled gates 22 and 23, and ferroelectric capacitors 24 and 25.

The circuit is now in condition to begin successive comparisons of the input signal sample with those stored in the reference capacitors 24 and 25 in order to provide output binary code indications which will define the amplitude of the stored signal sample. Pulses 102 and 103 are applied from clock generator and gate control 29 to various logic gates in the circuit throughout the operation. These pulses, as indicated in FIG. 2, appear, out of phase, in each time interval $T_0$ through $T_7$ comprising an operating cycle. Thus, upon storage of the input signal sample in sampling capacitor 15, a pulse 102 is applied during time $T_0$ by clock generator and gate control 29 to AND gate 13, which pulse, together with the positive signal sample as received through amplifier 12, enables AND gate 13 to apply an input signal to the set terminals of flip-flop circuit 14. In this instance the setting of flip-flop 14 energizes the output lead 51 from its terminal X.

The appearance of pulse 103 from clock generator and gate control 29, FIG. 1, in time $T_1$, together with the signal pulse 106 on lead 51 from the flip-flop 14, serves to enable inhibit gates 16 and 17 upon removal of the respective inhibit input pulses 104 and 105, FIG. 2, therefrom. The inhibit input pulse 104 for gate 16 appears only in time $T_0$ immediately after operation of the sampling gate 11 and thus serves to prevent the appearance of an output signal at this time. Similarly, pulse 105 is applied to the inhibit input of gates 17 and 19 during the sampling operation in time $T_7$ and $T_0$, as indicated in FIG. 2, so as to prevent premature operation of the reference signal circuitry. Thus upon the setting of flip-flop 14 in the next time interval $T_1$, FIG. 2, the appearance of a signal pulse 106 on output lead 51, together with a pulse 103, enables gates 16 and 17 to provide an output signal and to activate the reference signal circuitry, respectively.

The resultant output signal from gate 16 is a positive pulse indicative of the binary digit "1," as shown in the time interval $T_1$ in FIG. 2. This first output binary code digit indicates the polarity of the input signal sample and thus is termed the "polarity bit." Simultaneously, the gate 18 is activated by the output pulse 108 from inhibit gate 17 such that a reference signal appearing on lead 54 is transmitted to the sampling capacitor 15. The signal on lead 54 results from the operation of ring counter 28 which is cyclically advanced in each time interval by the pulse 103 such that, in interval $T_1$, the ring counter output serves to switch the capacitor designated 30 in capacitor block 25. Capacitor 30 is the largest ferroelectric reference signal storage capacitor in the group of capacitors 25 storing signals of a polarity opposite to that stored in the sampling capacitor 15 and is defined by upper electrode $25_{32}$ and the lower electrode $25_c$. Thus in this instance negative polarity signals are stored in capacitor block 25 and capacitor 30 when switched by the ring counter output in conjunction with enablement of gate 18, applies −32 units of charge through lead 54, enabled gate 18, and lead 21 to the storage capacitor 15 where it serves to alter the stored input signal sample.

The charge remaining in sampling capacitor 15 after this comparison has a value of +3 units as shown in time $T_1$, FIG. 2. Also in time $T_1$, as in each successive time interval, flip-flop 14 is reset by pulse 110. However, as a positive sample is still present after the first comparison operation, flip-flop 14 again is set upon application of pulse 102 to gate 13 during time $T_1$, and the output lead 51 from terminal X of flip-flop 14 again is energized. Thus another positive output signal is transmitted from gate 16 upon application of pulse 103 thereto in the next time interval $T_2$. Also during time interval $T_2$ pulse 103 and the pulse 106 on lead 51 again enable inhibit gate 17 which in turn enables gate 18. This sequence, coupled with advance of the ring counter by the pulse 103 in time $T_2$, permits the second largest binary weighted reference capacitor in the capacitor block 25 to be switched and its −16 units of charge to be applied to the sampling capacitor 15. As the capacitor 15 contained +3 units, the receipt of −16 units at this time results in a negative balance of −13 units, as indicated in time $T_2$, FIG. 2.

Flip-flop 14 is reset by pulse 110 in time $T_2$ as before, but in this instance the negative charge on sampling capacitor 15 prevents the setting of flip-flop 14. Thus upon receipt of pulse 103 at output gate 16 in time $T_3$, there is no coincident signal on lead 51 from flip-flop 14, and gate 16 fails to provide a position output signal. Absence of a positive output signal in time $T_3$, when an output signal is due, is indicative, in this example, of the presence of the opposite binary code condition, in this instance designated as a binary "0." The failure of flip-flop 14 to be set during time $T_2$ also results in output terminal X′ providing a pulse 107, FIG. 2, on lead 52 which is coincident with the occurrence of pulse 103 in time $T_3$. This condition permits gate 19 to provide an output pulse 109 which enables gate 20 in time $T_3$ as shown in FIG. 2. The operation of gate 20, in turn, permits the next reference signal to come from the positive capacitor group 24 and specifically from the capacitor defined by electrode $24_8$. Thus +8 units of charge are applied to sampling capacitor 15.

The reference level of +8 units leaves a balance of −5 units in capacitor 15, as shown in time $T_3$, FIG. 2. Thus flip-flop 14 again fails to provide an output signal on lead 51 and a binary "0" is recorded in the output circuit in time $T_4$. Also, the flip-flop output pulse 107 from X′ again activates inhibit gate 19 so as to operate gate 20 which in turn introduces the next lowest reference level of +4 units into sampling capacitor 15. As indicated in time $T_4$, however, the charge remaining in capacitor 15 after this action is still negative; viz., −1 unit, so that once more a binary "0" output is provided in time $T_5$.

The comparison conducted during time $T_5$ includes the positive reference capacitor containing the next lowest reference level of +2 units. The introduction of the reference level of +2 units into the sampling capacitor 15 containing −1 unit results once more in a positive resultant signal of +1 unit stored in capacitor 15 during time $T_5$. In the manner previously described, this positive resultant signal causes a positive binary "1" to be sent out on communication link 10 in time $T_6$ and at the same time it effects a transmission of the −1 unit charge from the final reference ferroelectric capacitor in negative block 25 to sampling capacitor 15 so as to reduce the charge thereon substantially to zero. However, as some charge remains in storage capacitor 15, the final output signal, representing the least digit of the output binary code train, is transmitted to communication link 10 in time $T_7$.

No further reference capacitors remain to be switched, and inhibit pulse 105 again is applied to gates 17 and 19, serving to isolate the ferroelectric capacitor groups 24 and 25 from storage capacitor 15 during time $T_7$ and $T_0$ so that they may be returned to their preselected polarization states by the connection and subsequent disconnection of potential sources 26 and 27. It should be noted that regardless of the value of the input signal sample, the charge remaining on storage capacitor 15 after the last reference signal is applied will always be less than $\frac{1}{64}$ of the maximum amplitude, and its removal prior to receipt of the next input signal sample is not required. This ability to omit a clamping operation between successive coding cycles advantageously increases the speed of operation of the encoder. Thus, in time $T_7$ pulse 101 again enables input gate 11 to apply a new signal sample to capacitor 15 and enables gates 22 and 23 to apply resetting signals to the ferroelectric capacitors in blocks 24 and 25, respectively, while the final digit in the coded output representing the previous signal sample is being transmitted from gate 16.

Pulse 104 appearing in interval $T_0$ and pulse 105 appearing in interval $T_7$ and maintained through $T_0$ insure that the reference and sampling capacitors are properly charged prior to appearance of the first output code indication for the new sample. The ring counter 28 also completes its cycle so that it is again prepared, in time $T_1$, to switch the largest binary weighted charge in ferroelectric capacitor groups 24 and 25.

It is evident, as indicated in accordance with one aspect of the invention, that the fabrication of each of the two groups of ferroelectric capacitors 24 and 25 in distinct unitary blocks of ferroelectric material is readily adapted to the particular novel circuit operation. Such fabrication provides a more economical coder and may be accomplished while maintaining the desired precise formation and storage capacity of each ferroelectric unit. Connection of the input leads to the individual ferroelectric units and of the requisite common output lead to each group is easily facilitated.

A summary rather than a detailed account of a decoding operation is included in that its operation is similar in many aspects to the reverse of the encoder operation previously described.

Figure 3:
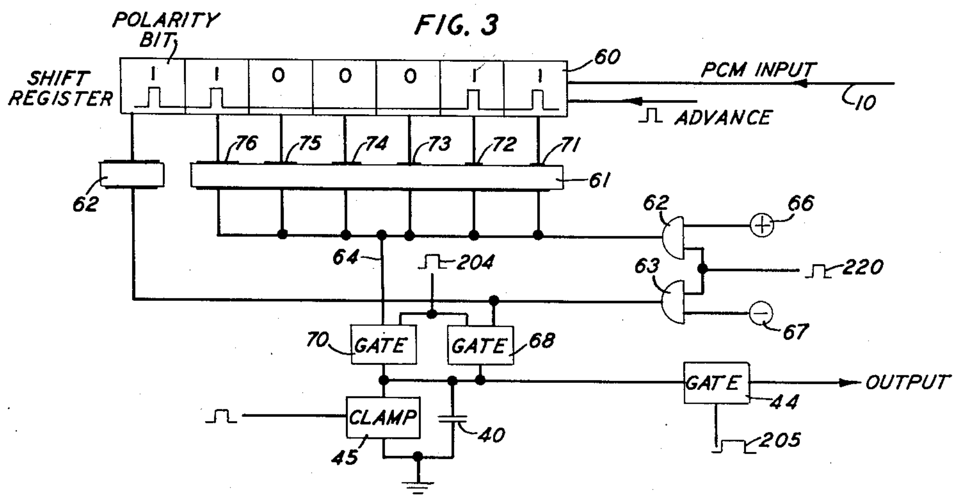
FIG. 3 is a decoder for use with the embodiment of FIG. 1.

Shown in FIG. 3 is a decoder for use with the embodiment of the described encoder. A common communication link 10 provides a connection that establishes the PCM train at the input of shift register 60. Shift register 60 might advantageously be of the type well known in the art that utilizes a back edge transfer pulse to serially advance the PCM train into the shift register stages. The outputs of shift register 60 are connected to two distinct ferroelectric elements 61 and 62. Ferroelectric element 61 may advantageously be identical in structure to ferroelectric elements 24 or 25 shown in FIG. 1. Ferroelectric element 62, however, contains only one capacitor storage element and could advantageously be on the same piece of material 61. These ferroelectric elements 61 and 62, in the manner described in the encoder operation, are established in their respective polarization states by the application of the positive and negative voltage sources 66 and 67 by the enablement of AND gates 62 and 63.

The transmission gates 68 and 70, which advantageously are of the same type as gates 18 and 20, FIG. 1, are utilized to conduct the reference signal levels produced by the ferroelectric elements to a storage capacitor 40. The reference signal levels accumulated by storage capacitor 40 comprise the restored amplitude representation of the initial input signal sample. This accumulated information may be transmitted to a receiving circuit through gate 44 when desired. A clamping gate 45 of the type well known in the art is provided so that once the restored amplitude signal has been transmitted to the receiving circuit any remaining excess charge may be clamped to ground.

The decoding operation can best be illustrated by considering the processing of a typical input signal which, for explanatory purposes, will be the PCM train produced by the encoder of FIG. 1. The operation is initiated by the entrance and serial advancement of the PCM code train in shift register 60. At any desired time interval after the entrance of the PCM code and before its complete advancement into the shift register stages, pulse 220 may be provided to enable AND gates 62 and 63 so as to connect and disconnect the positive and negative voltage sources 66 and 67 to the ferroelectric elements. This procedure requires only that the voltage sources 66 and 67 be of greater magnitude than the output voltage of the shift register so that the ferroelectric elements 61 and 62 may be placed in their preselected polarization states, which states will persist until operation of gates 68 and 70 provides a switching path to ground through storage capacitor 40.

The voltages necessary to accomplish the switching of ferroelectric elements 61 and 62 are provided at the output of each stage of the shift register and are either positive or negative depending upon the presence of the binary indication in that particular stage. For instance, the capacitor electrode of ferroelectric block 61, which is set in a positive polarization state, is connected to the shift register in such a manner that a presence of a "1" in any of the last six shift register stages establishes a switching potential at the capacitor electrode. The capacitor electrode of ferroelectric block 62, set in a negative polarization state, is connected to the shift register stage in such a manner that the presence of a "1" in the polarity bit stage does not establish a switching potential.

For purposes of explanation, the code train produced by the encoder of FIG. 1 is shown as it would appear in the various shift register stages prior to the operation of gates 68 and 70 which would establish the desired switching paths for the several ferroelectric capacitors. At the time interval that the code train reaches the position shown, pulse 204 operates gates 68 and 70 thereby establishing a completed path to effect switching of the ferroelectric capacitors connected to the stages containing the proper binary indication. In this example, the conditions established effect switching of capacitors 71, 72, and 76 having binary weighted charges +1, +2, and +32, respectively. These charges are transmitted through lead 64 and gate 70 to be accumulated as +35 units by storage capacitor 40, and thereby produce the restored amplitude representation of the initial input signal sample. One time interval after this charge accumulation by storage capacitor 40, pulse 205 operates gate 44 so that the accumulated signal is transmitted to a receiving circuit as desired. The operation of the clamping gate then occurs to remove any residual charge from capacitor 40, prior to a following decoding operation.

Although a figure showing the series of pulse trains and wave forms associated with the operation of the decoder has not been shown, it should be understood that the proper operation of the decoder may advantageously be obtained by utilization of a clock generator and gate control circuit similar to circuit 29 in FIG. 1.

From the above description, it can be determined then that a positive signal sample is reconstructed solely by the addition of the charges from the switched ones of capacitors 71 through 76. A negative signal sample, on the other hand, is reconstructed by initially switching ferroelectric capacitor 62 containing a negative charge of the same magnitude as the absolute summation of the charges in capacitors 71 and 76 and thereafter by switching the corresponding positive ferroelectric capacitors so as to provide a complementary output indication which is a desired negative amplitude level.

It is to be understood that the above-described arrangements are illustrative of the application of the principles of the invention. Numerous other arrangements may be devised by those skilled in the art without departing from the spirit and scope of the invention.

What is claimed is:

1. An encoding circuit comprising a storage capacitor for storing an amplitude signal sample, a first and a second plurality of ferroelectric capacitors having graded charge capacities for the storage of reference signals, said first and second pluralities storing opposite polarity reference signals, means for decreasing the absolute amplitude of said signal sample in steps comprising means for applying to said storage capacitor successive reference signals from said ferroelectric capacitors of opposite polarity than that of the remaining portion of the signal sample in said storage capacitor at the instant of application of each specific reference signal, and means for generating an output signal after each such decrease of said signal sample only on the remaining portion of the signal sample on said storage capacitor being of a predetermined polarity.

2. An encoding circuit in accordance with claim 1 wherein said graded ferroelectric capacitors in said first and second pluralities have electrode areas corresponding to binary weightings.

3. An encoding circuit in accordance with claim 1 further comprising means for generating a polarity bit output signal on said signal sample being of said one polarity prior to any decrease thereof.

4. An encoding circuit comprising a storage capacitor for storing an amplitude signal sample, a first and a second plurality of ferroelectric capacitors having graded charge capacities corresponding to binary weightings, said first and second plurality of ferroelectric capacitors storing opposite polarity reference signals, means for successively activating a ferroelectric capacitor from said first and second plurality in order of decreasing charge capacity, means for decreasing the absolute amplitude of said signal sample on said storage capacitor comprising means connecting said storage capacitor to said activated one of said first and second plurality ferroelectric capacitors having a reference signal of opposite polarity to that of the remaining portion of the signal sample in said storage capacitor at that instant, and means for generating an output signal only on the remaining portion of the signal sample stored on said storage capacitor after each decrease of its absolute amplitude being of a predetermined polarity.

5. An encoding circuit comprising a storage capacitor for storing an amplitude signal sample, means for transferring successive reference signals to said storage capacitor to diminish the absolute amplitude of said signal sample, said reference signals having metered values of successively decreasing binary weighted charges, means for determining that the reference signal transferred at any instant to said storage capacitor is of opposite polarity to the remaining portion of said signal sample on said storage capacitor, and means for transmitting an output pulse after each diminution by said reference signals only when the portion of the signal sample remaining on said storage capacitor is of a predetermined polarity.

6. An encoding circuit in accordance with claim 5 further comprising means for also transmitting a polarity bit output pulse prior to diminution of said signal sample or said initially stored signal sample being of said one polarity.

7. An encoding circuit comprising storage means for storing an amplitude signal sample, means for applying successive reference signals to said storage means to diminish the absolute amplitude of said signal sample, said reference signals having metered values of successively decreasing graded changes, means for determining that the reference signal applied at any instant to said storage means is of opposite polarity to the remaining portion of said signal sample on said storage means and means for transmitting a plurality of output pulses, one of said transmitted output pulses being indicative of the initial polarity of said signal sample and the remainder of said pulses being transmitted after each diminution only when the remaining portion of the signal sample on said storage means is of a predetermined polarity.

8. A signal transmitting system for transforming a signal amplitude sample into a binary code group occupying a predetermined number of successive time intervals comprising a storage capacitor for storing an amplitude signal sample, means for applying successive reference signals to said storage capacitor to diminish the absolute amplitude of said signal sample, said reference signals having successively decreasing graded changes, means for determining that the reference signal applied during any of said time intervals is of opposite polarity to the instant portion of said signal sample on said storage capacitor, and means for transmitting output pulses in accordance only with one polarity of said signal existing in said storage capacitor in each time interval.

9. A signal translating system comprising first storage means, means for storing an input signal in said first storage means, a plurality of capacitive storage means, means for varying the input signal stored in said first storage means comprising means for selectively connecting said capacitive storage means to said first storage means, and means for generating coded indications of said input signal comprising polarity comparison means connected between said first storage means and said connecting means for activating said connecting means upon each variation in the stored input signal.

10. A signal translating system in accordance with claim 9 wherein said capacitive storage means comprises two groups of capacitive elements, each of said capacitive elements having a distinct charge capacity.

11. A signal translating system in accordance with claim 10 wherein each of said capacitive elements has a dielectric of ferroelectric material.

12. A signal translating system in accordance with 10 and further comprising means for storing signals of one polarity in one of said groups of capacitive elements and for storing signals of the opposite polarity in the other group.

13. A signal translating system in accordance with claim 10 wherein said connecting means comprises gating means connected to each of said groups of capacitive elements and means for selectively enabling said gating means dependent upon the polarity of the signal stored in said first storage means.

14. A signal translating system comprising storage means, means for storing an input signal of one polarity in said storage means, a plurality of ferroelectric reference signal storage elements, means for altering the signal stored in said storage means comprising means responsive to the polarity of said signal in said storage means for selectively connecting said ferroelectric elements to said storage means, an output circuit, and means for applying coded indications to said output circuit in response to each alteration of the signal in said storage means comprising bistable logic means connected between said storage means and said connecting means.

15. A signal translating system in accordance with claim 14 wherein said ferroelectric elements comprise a first group normally set in a first stable remanent polarization state and a second group normally set in a second remanent polarization state.

16. A signal translating system in accordance with claim 14 wherein said connecting means comprises first gating means connected to said first group of ferroelectric elements and second gating means connected to said second group of ferroelectric elements, said bistable logic means selectively enabling said first and second gating means.

17. A system for translating the amplitude of an input signal sample into a train of binary output indications occupying a predetermined number of successive time intervals comprising a source of discrete valued reference signals, means for activating said reference signal source in each time interval to provide a pair of reference signals of the same value but opposite polarity, signal comparison means including means for adding algebraically a distinct reference signal appearing in each successive time interval with the input signal sample and each succeeding comparison resultant, means for indicating the polarity of each comparison resultant, means connected to said polarity indicating means for applying the reference signal of a polarity opposite to that of said comparison resultant to said comparison means, and output means connected to said polarity indicating means for providing an output indication dependent upon the polarity of the comparison resultant.

18. A system in accordance with claim 17 wherein said reference signal source comprises oppositely charged groups of ferroelectric capacitors, the capacitors within a group being distinct in charge capacity and each corresponding in absolute value to that of one capacitor in the other group.

19. A system in accordance with claim 18 wherein each of said groups of ferroelectric capacitors comprises a thin elongated strip of ferroelectric material having two parallel broad faces, a series of distinct electrodes of different areas on one of the said broad faces and another electrode on the parallel one of said broad faces.

20. A signal translating system in accordance with claim 19 wherein said distinct electrodes differ in area according to a binary numbering system.

21. A system in accordance with claim 17 wherein said signal comparison means includes a signal storage capacitor.

22. A system in accordance with claim 17 wherein said polarity indicating means comprises a bistable flip-flop.

23. A system in accordance with claim 22 wherein said means connected to said polarity indicating means comprises a pair of inhibit gates and a pair of transmission gates.

24. A system in accordance with claim 17 wherein said activating means comprises a ring counter.

25. A signal translating system for transforming a signal amplitude sample into a binary code group occupying a predetermined number of successive time intervals comprising storage means, means for storing an input signal in said storage means, a plurality of ferroelectric capacitors defining a first series of positive reference signals and a second series of negative reference signals, means for establishing reference signals in said successive time intervals comprising means for switching corresponding elements in said first and second series of ferroelectric reference capacitors, means for applying particular ones of said reference signals to said storage means comprising first gating means connected to said first series of reference capacitors and second gating means connected to said second series of reference capacitors, output means, and means connected to said storage means for selectively activating said first and second gating means and for transmitting said binary code group of said output means in accordance with the polarity of the signal in said storage means in each time interval.

26. A signal translating system in accordance with claim 25 wherein said output means comprises an inhibit gate synchronized with said input means so as to transmit the final preceding digit of said code group as said input means stores a new sample of said input signal.

27. A signal translating system comprising a storage capacitor, an input gate, means for activating said input gate to store an input signal amplitude sample in said capacitor, and means for translating said signal amplitude sample stored in said capacitor into a binary code group occupying a predetermined number of successive time intervals, said translating means comprising a plurality of ferroelectric capacitors having positive signals stored in a first series and negative signals stored in a second series, a pulsing circuit for sequentially activating particular ones of said first and second series of ferroelectric capacitors, first and second gating means connected to said first and second series of ferroelectric capacitors respectively for transmitting a signal from an activated ferroelectric capacitor to said storage capacitor in each time interval, means for selectively enabling said first and second gating means comprising a coincidence gate, a flip-flop and an inhibit gate connected in series between said capacitor and said first and second gating means, and output means comprising an inhibit gate connected to said flip-flop to deliver said binary code group following selected activations of said first and second series of ferroelectric capacitors.

28. A signal translating system comprising means for storing a coded input signal representative of an original signal sample, and means for reconstituting said original signal in accordance with said coded input signal, said reconstituting means comprising a group of ferroelectric capacitors having selected capacitors in said group set in one remanent polarization state and the remainder of said group set in an opposite remanent polarization state, said group of capacitors being responsive to particular digits of said coded signal stored in said first means for switching their respective remanent polarization states, signal accumulating means, and means connected between said ferroelectric group and said accumulating means for simultaneously conducting charges from said switched capacitors to said accumulating means, said accumulating means being responsive to said connecting means for reconstituting said original signal sample from said switched charges of said ferroelectric capacitors.

29. A signal translating system in accordance with claim 28 wherein said selected capacitors in said group of ferroelectric capacitors have binary graded charge capacities and said remainder of said group comprises a single ferroelectric capacitor having a charge capacity of the same magnitude as the absolute summation of the binary graded charge in said selected capacitors.

References Cited in the file of this patent

UNITED STATES PATENTS

| | | |
|---|---|---|
| 2,592,308 | Meacham | Apr. 8, 1952 |
| 2,864,079 | Anderson | Dec. 9, 1958 |